(12) United States Patent
Wang et al.

(10) Patent No.: US 8,526,454 B2
(45) Date of Patent: Sep. 3, 2013

(54) APPARATUS AND METHOD FOR BIT REMAPPING IN A RELAY ENHANCED COMMUNICATION SYSTEM

(75) Inventors: Haifeng Wang, Shanghai (CN); Jorma Lilleberg, Oulu (FI); Jing Xu, Shanghai (CN); Fang Wang, Nanjing (CN)

(73) Assignee: Nokia Corporation, Espoo (FI)

( * ) Notice: Subject to any disclaimer, the term of this patent is extended or adjusted under 35 U.S.C. 154(b) by 435 days.

(21) Appl. No.: 12/413,200

(22) Filed: Mar. 27, 2009

(65) Prior Publication Data
US 2010/0246599 A1  Sep. 30, 2010

(51) Int. Cl.
 *H04J 3/00* (2006.01)
 *H04J 3/16* (2006.01)
 *H04L 5/12* (2006.01)

(52) U.S. Cl.
 USPC ............ 370/419; 370/465; 370/476; 375/261

(58) Field of Classification Search
 USPC ......... 370/419–476, 206–352; 375/132–221, 375/259–354; 714/748–752
 See application file for complete search history.

(56) References Cited

U.S. PATENT DOCUMENTS

| | | | | |
|---|---|---|---|---|
| 5,105,442 A * | 4/1992 | Wei | | 375/262 |
| 6,404,755 B1 * | 6/2002 | Schafer | | 370/338 |
| 6,717,993 B1 * | 4/2004 | Shiraishi et al. | | 375/329 |
| 6,738,370 B2 * | 5/2004 | Ostman | | 370/349 |
| 6,765,926 B1 * | 7/2004 | Price et al. | | 370/466 |
| 7,283,509 B2 * | 10/2007 | Moon et al. | | 370/342 |
| 7,397,861 B2 * | 7/2008 | Frederiksen et al. | | 375/260 |
| 7,558,191 B2 * | 7/2009 | Monogioudis et al. | | 370/208 |
| 7,764,707 B2 * | 7/2010 | Li | | 370/465 |
| 8,112,033 B2 * | 2/2012 | Xue et al. | | 455/11.1 |
| 8,189,453 B2 * | 5/2012 | Monogioudis et al. | | 370/203 |
| 8,301,950 B2 * | 10/2012 | Bu et al. | | 714/748 |
| 2003/0072292 A1 * | 4/2003 | Yoon et al. | | 370/342 |
| 2008/0056334 A1 * | 3/2008 | Suh et al. | | 375/132 |
| 2008/0259857 A1 * | 10/2008 | Zheng | | 370/329 |
| 2008/0260067 A1 * | 10/2008 | Wengerter et al. | | 375/298 |
| 2008/0273522 A1 * | 11/2008 | Luo et al. | | 370/350 |
| 2008/0310359 A1 * | 12/2008 | McBeath et al. | | 370/329 |
| 2010/0008284 A1 * | 1/2010 | Chae et al. | | 370/315 |
| 2010/0054173 A1 * | 3/2010 | Kim et al. | | 370/315 |
| 2010/0166111 A1 * | 7/2010 | Park et al. | | 375/298 |

(Continued)

FOREIGN PATENT DOCUMENTS

| | | |
|---|---|---|
| WO | WO 2006/119794 A1 | 11/2006 |
| WO | WO 2008/044902 A1 | 4/2008 |

OTHER PUBLICATIONS

Chae, S.C. et al., "Demodulation and Forwarding method in Relay Station," IEEE 802.16 Broadband Wireless Access Working Group, IEEE C802.16j-07/052, http://ieee802.org/16>, Jan. 8, 2007, 9 pages.

(Continued)

*Primary Examiner* — Man Phan
(74) *Attorney, Agent, or Firm* — Harrington & Smith

(57) ABSTRACT

An apparatus and method for bit remapping at a relay node in a communication system. In one embodiment, an apparatus includes a processor configured to remap an order of bits of a received signal from a source node to a different order of bits for a transmitted signal to a destination node when the transmitted signal is constructed with a modulation scheme different from the received signal.

20 Claims, 13 Drawing Sheets

(56) References Cited

U.S. PATENT DOCUMENTS

| | | | |
|---|---|---|---|
| 2010/0169748 A1* | 7/2010 | Zhao et al. | 714/790 |
| 2010/0208680 A1* | 8/2010 | Nam et al. | 370/329 |
| 2010/0211842 A1* | 8/2010 | Moon et al. | 714/748 |

OTHER PUBLICATIONS

Chae, Suchang, et al., "Enhanced MCS for Direct Relaying in Transparent RS of IEEE 802.16j," IEEE Feb. 17-20, 2008, pp. 1070-1073.

* cited by examiner

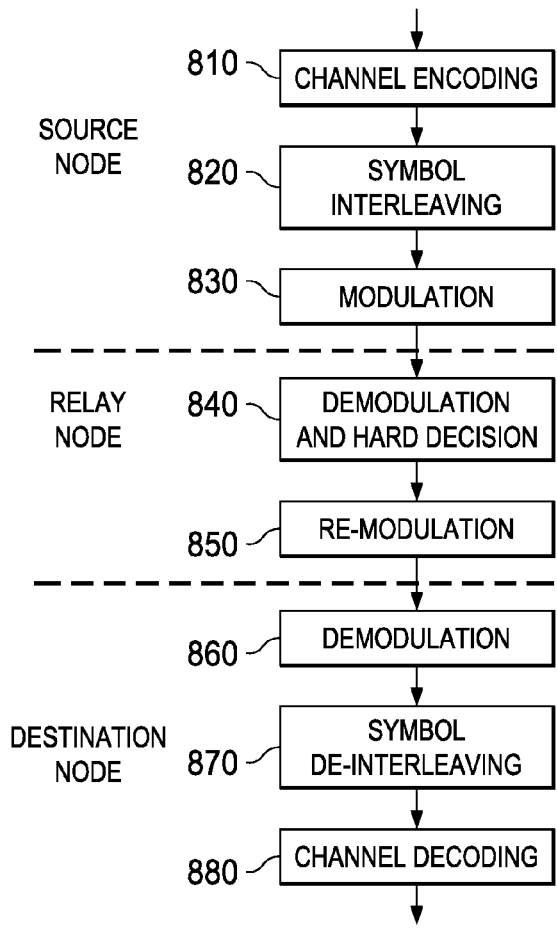
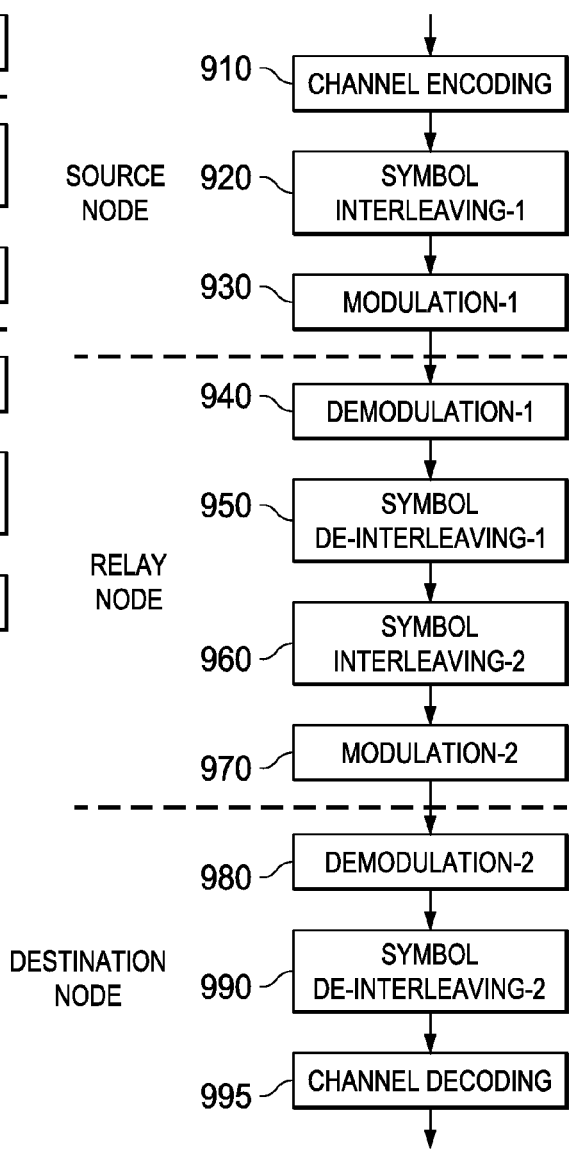
FIG. 8
FIG. 9

APPARATUS AND METHOD FOR BIT REMAPPING IN A RELAY ENHANCED COMMUNICATION SYSTEM

TECHNICAL FIELD

The present invention is directed, in general, to communication systems and, in particular, to an apparatus and method for bit remapping at a relay node in a communication system.

BACKGROUND

Long term evolution ("LTE") of the Third Generation Partnership Project ("3GPP"), also referred to as 3GPP LTE, refers to research and development involving the 3GPP Release 8 and beyond, which is the name generally used to describe an ongoing effort across the industry aimed at identifying technologies and capabilities that can improve systems such as the universal mobile telecommunication system ("UMTS"). The goals of this broadly based project include improving communication efficiency, lowering costs, improving services, making use of new spectrum opportunities, and achieving better integration with other open standards. The 3GPP LTE project is not itself a standard-generating effort, but will result in new recommendations for standards for the UMTS.

The Evolved Universal Terrestrial Radio Access Network ("E-UTRAN") in 3GPP includes base stations providing user plane (including packet data convergence protocol/radio link control/medium access control/physical ("PDCP/RLC/MAC/PHY") sublayers) and control plane (including radio resource control ("RRC") sublayer) protocol terminations towards wireless communication devices such as cellular telephones. A wireless communication device or terminal is generally known as user equipment ("UE"). A base station ("BS") is an entity of a communication network often referred to as a Node B or an NB. Particularly in the E-UTRAN, an "evolved" base station is referred to as an eNodeB. For details about the overall architecture of the E-UTRAN, see 3GPP Technical Specification ("TS") 36.300 v8.5.0 (2008-05), which is incorporated herein by reference.

As wireless communication systems such as cellular telephone, satellite, and microwave communication systems become widely deployed and continue to attract a growing number of users, there is a pressing need to accommodate a large and variable number of communication devices transmitting a growing range of communication applications with fixed resources. Traditional communication system designs employing a fixed communication resource have become challenged to accommodate the rapidly growing customer base and the expanding levels of service. One area that has challenged the need to expand communication links over longer distances is the use of a communication node such as an intermediate relay node between user equipment and a base station. Relaying by an intermediate node between a user equipment and a base station can be employed in wireless communication systems to increase system radio coverage area, enhance channel reliability, provide cooperative diversity, offer inter-user cooperation, etc.

In relay-enhanced wireless communication systems, an access communication link or access link (a source-to-relay node link) and a relay communication link or relay link (a relay-to-destination node link) may provide less than desirable performance and different levels of communication channel quality in different radio environments, particularly in the presence of various levels of noise in a communication link. To improve the overall throughput of a wireless communication system, an adaptive modulation and coding ("AMC") strategy may be applied separately to the access link and the relay link. For example, for the uplink case from user equipment to a base station through a relay node, the access link is from the user equipment to the relay node, which may be the less reliable link. The relay link refers to the link from a relay node to a base station, and this link may be the more reliable link. In this case, the modulation order of the relay link may be higher than that of the access link.

To include more general, practical communication systems, the access and relay links may be referred to as a "first hop" and a "second hop." In the uplink case, the first hop refers to a link from the user equipment to a relay node, and the second hop refers to the link from the relay node to a base station or to a relay node to another relay node. In this general description, in a downlink case of a one relay-enhanced wireless communication system, the first hop may refer to the link from a base station to a relay node, and the second hop may refer to a link from a relay node to a user equipment.

To provide reliable and efficient communication from user equipment through a relay node to a base station, it is necessary to re-modulate and forward received signals at a relay node operating under a demodulate and forward ("DmF") mode, as described in IEEE Standard C802, 16j-07/052r13, entitled "Demodulation and Forwarding Method in Relay Stations," Jul. 19, 2007, which is incorporated herein by reference. A demodulate and forward relay node demodulates and makes hard detection decisions on its received signals to form an estimated codeword, and then forwards the estimated codeword to the destination node.

In a conventional wireless communication system employing a relay node, the bits of a received signal are sequentially mapped into the bits of a transmitted signal. In view of the growing deployment of communication systems such as cellular communication systems and market expectations for reliable communication between a base station and the user equipment, it would be beneficial to incorporate improvements for mapping the bits of a received signal at a relay node on to a transmitted signal when the transmitted signal is transmitted with a modulation scheme different from the modulation scheme of the received signal. Therefore, what is needed in the art is a system and method that avoids deficiencies of bit mapping schemes at a relay node employed in present communication systems.

SUMMARY OF THE INVENTION

These and other problems are generally solved or circumvented, and technical advantages are generally achieved, by embodiments of the present invention, which include an apparatus and method for bit remapping at a relay node in a communication system. In one embodiment, an apparatus (e.g., a relay node) includes a processor configured to remap an order of bits of a received signal from a source node to a different order of bits for a transmitted signal to a destination node when the transmitted signal is constructed with a modulation scheme different from the received signal.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which:

FIG. 8 illustrates a flowchart demonstrating signal processing in a demodulate and forward mode at a relay node;

FIG. 9 illustrates a flowchart demonstrating a bit mapping process in a demodulate and forward relay node when a different modulation scheme is employed for two hops;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of a system and method for mapping bits of a received signal at a relay node on to a transmitted signal, particularly when the transmitted signal is transmitted with a modulation scheme different from the modulation scheme of the received signal.

Figure 1:
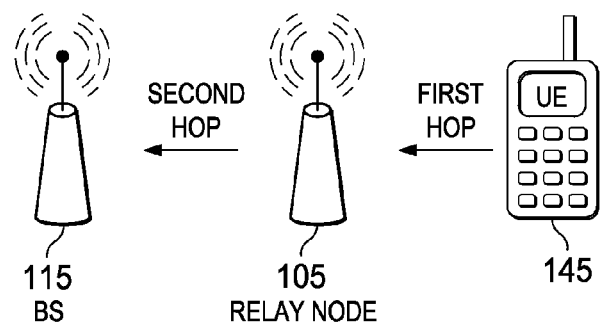
FIGS. 1, 2, and 3 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station ("BS") 115 and a wireless communication device that provides an environment for application of the principles of the present invention. In the illustrated embodiment, a relay node 105 communicates with the base station 115 (a destination node) and the wireless communication device 145 (e.g. user equipment ("UE"), a source node). The relay node 105 may be another base station or another user equipment. In the exemplary scenario illustrated in FIG. 1, a lower order modulation scheme is used for a first hop and a higher order modulation scheme is used for a second hop.

Thus, the communication system is employed with a communication link in a relay-enhanced communication network that includes two hops employing the relay node 105. The relay node 105 employs a demodulate and forward ("DmF") mode and the modulation scheme is chosen independently for each hop. While the modulation order might be same for each hop, in the instant case, the second hop is more reliable then the first hop such that a lower order modulation is used for the first hop, and a higher order modulation is used for the second hop. Contrary to the modulation scheme mentioned above, current wireless communication systems typically do not use a mode of operation wherein a different order demodulator and/or modulator are employed at a relay node 105.

Figure 2:
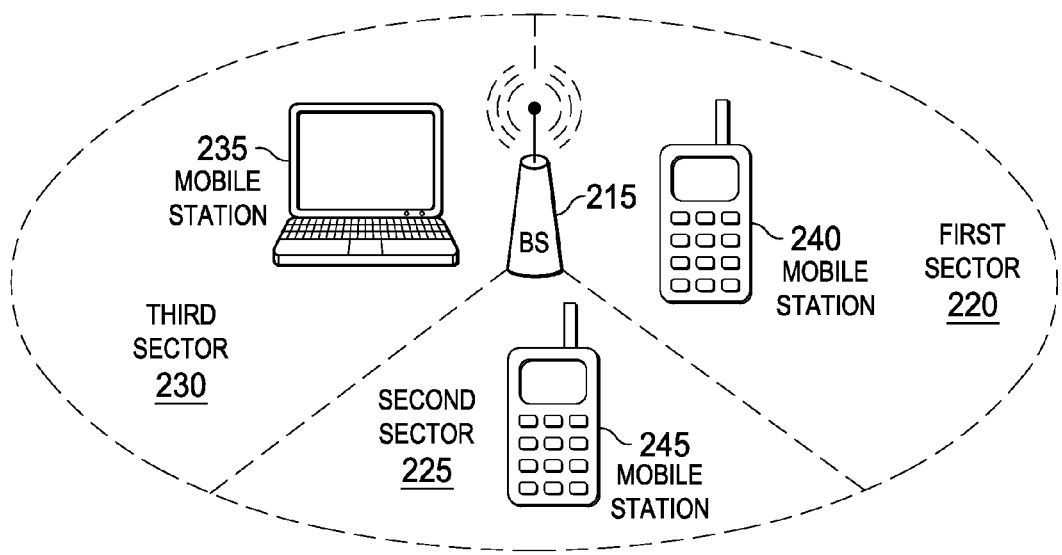

Turning now to FIG. 2, illustrated is a system level diagram of an embodiment of a communication system including a base station ("BS") 215 and wireless communication devices 235, 240, 245 (e.g., mobile station such as user equipment) that provides an environment for application of the principles of the present invention. The base station 215 is coupled to a public switched telephone network (not shown). The base station 215 is configured with a plurality of antennas to transmit and receive signals in a plurality of sectors including a first sector 220, a second sector 225, and a third sector 230, each of which typically spans 120 degrees. The sectors are formed by focusing and phasing the radiated and received signals from the base station antennas. The plurality of sectors increases the number of the wireless communication devices 235, 240, 245 that can simultaneously communicate with the base station 215 without the need to increase the utilized bandwidth by reduction of interference that results from focusing and phasing base station antennas. The radiated and received frequencies utilized by the communication system illustrated in FIG. 2 would typically be two gigahertz to provide non-line-of-sight communication.

Figure 3:
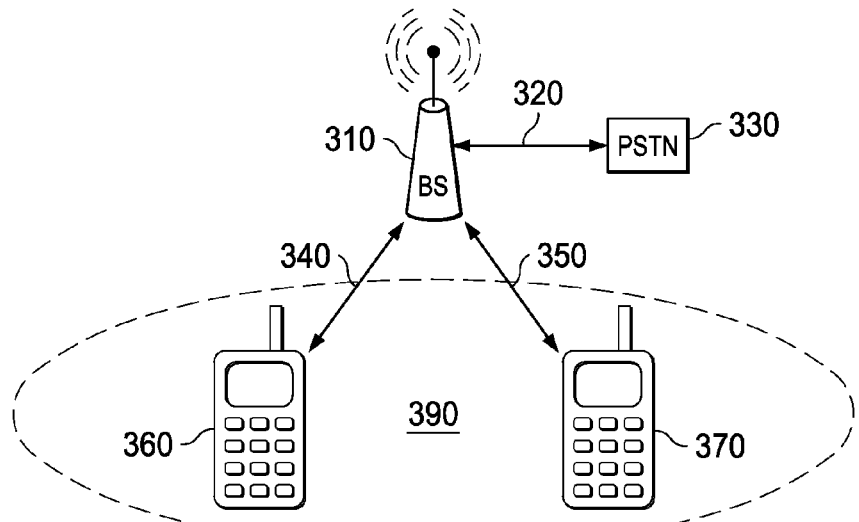

Turning now to FIG. 3, illustrated is a system level diagram of an embodiment of a communication system including wireless communication devices that provides an environment for application of the principles of the present invention. The communication system includes a base station ("BS") 310 coupled by communication link or path 320 (e.g., by a fiber-optic communication path) to a core telecommunications network such as public switched telephone network ("PSTN") 330. The base station 310 is coupled by wireless communication links or paths 340, 350 to wireless communication devices 360, 370, respectively that lie within its cellular area 390.

In operation of the communication system illustrated in FIG. 3, the base station 310 communicates with each wireless communication device 360, 370 through control and data communication resources allocated by the base station 310 over the communication paths 340, 350, respectively. The control and data communication resources may include frequency and time-slot communication resources in frequency division duplex ("FDD") and/or time division duplex ("TDD") communication modes.

Figure 4:
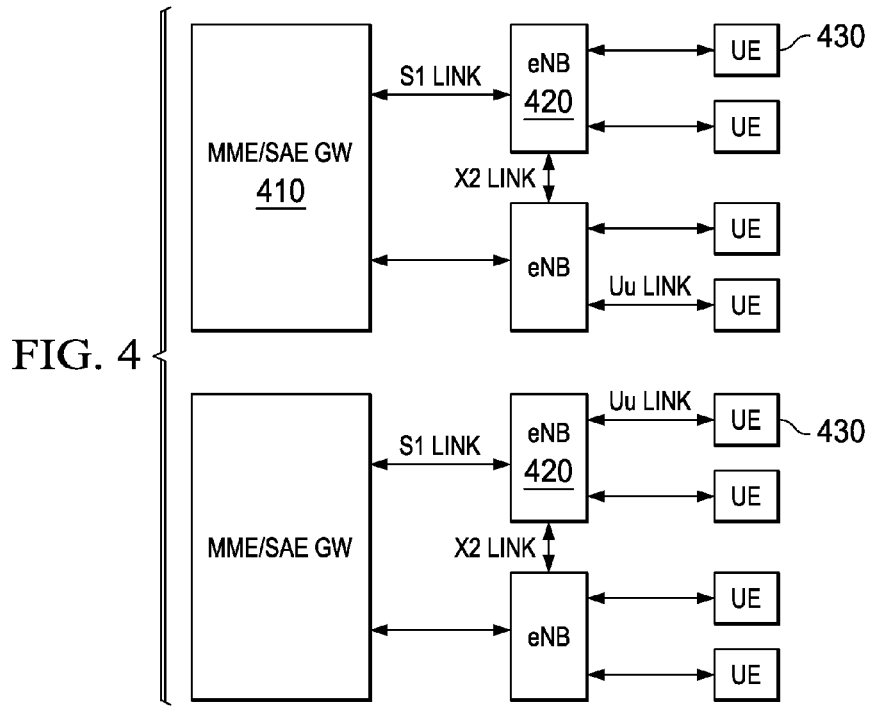
FIGS. 4 and 5 illustrate system level diagrams of embodiments of communication systems including a wireless communication systems that provide an environment for application of the principles of the present invention.

Turning now to FIG. 4, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 410) provides control functionality for an E-UTRAN node B (designated "eNB," an "evolved node B," also referred to as a "base station," one of which is designated 420) via an S1 communication link (ones of which are designated "S1 link"). The base stations 420 communicate via X2 communication links (designated "X2 link"). The various communication links are typically fiber, microwave, or other high-frequency metallic communication paths such as coaxial links, or combinations thereof.

The base stations 420 communicate with user equipment ("UE," ones of which are designated 430), which is typically a mobile transceiver carried by a user. Thus, communication links (designated "Uu" communication links, ones of which are designated "Uu link") coupling the base stations 420 to the user equipment 430 are air links employing a wireless communication signal such as, for example, an orthogonal frequency division multiplex ("OFDM") signal.

Figure 5:
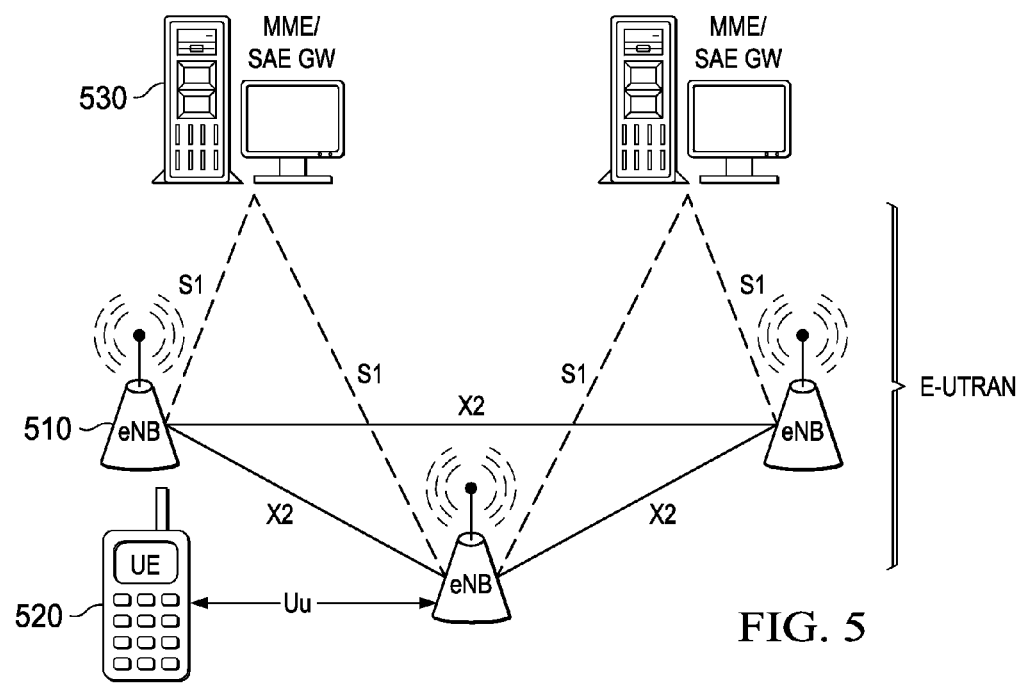

Turning now to FIG. 5, illustrated is a system level diagram of an embodiment of a communication system including a wireless communication system that provides an environment for the application of the principles of the present invention. The wireless communication system provides an E-UTRAN architecture including base stations (one of which is designated 510) providing E-UTRAN user plane (packet data convergence protocol/radio link control/media access control/physical) and control plane (radio resource control) protocol terminations towards user equipment 520. The base stations 510 are interconnected with X2 interfaces or communication links (designated "X2"). The base stations 510 are also connected by S1 interfaces or communication links (designated "S1") to an evolved packet core ("EPC") including a mobile management entity/system architecture evolution gateway ("MME/SAE GW," one of which is designated 530). The S1 interface supports a multiple entity relationship between the mobile management entity/system architecture evolution gateway 530 and the base stations 510. For applications supporting inter-public land mobile handover, inter-eNB active mode mobility is supported by the mobile management entity/system architecture evolution gateway 530 relocation via the S1 interface.

The base stations 510 may host functions such as radio resource management. For instance, the base stations 510 may perform functions such as internet protocol ("IP") header compression and encryption of user data streams, ciphering of user data streams, radio bearer control, radio admission control, connection mobility control, dynamic allocation of resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 530 may host functions such as distribution of paging messages to the base stations 510, security control, termination of U-plane packets for paging reasons, switching of U-plane for support of the user equipment mobility, idle state mobility control, and system architecture evolution bearer control. The user equipment 520 receives an allocation of a group of information blocks from the base stations 510.

Figure 6:
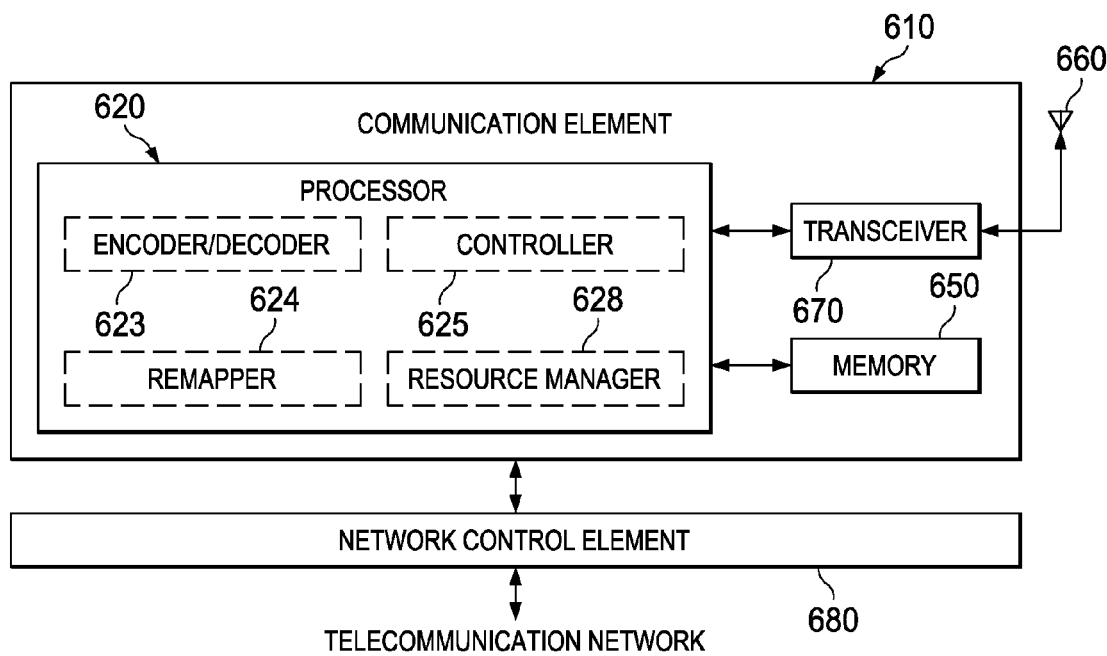
FIG. 6 illustrates a system level diagram of an embodiment of a communication element of a communication system for application of the principles of the present invention.

Turning now to FIG. 6, illustrated is a system level diagram of an embodiment of a communication element 610 of a communication system for application of the principles of the present invention. The communication element or device 610 may represent, without limitation, a base station, user equipment (e.g., a subscriber station, terminal, mobile station, a wireless communication device), a network control element, a communication node, or the like. The communication element 610 includes, at least, a processor 620, memory 650 that stores programs and data of a temporary or more permanent nature, an antenna 660, and a radio frequency transceiver 670 coupled to the antenna 660 and the processor 620 for bidirectional wireless communication. The communication element 610 may provide point-to-point and/or point-to-multipoint communication services.

The communication element 610, such as a base station in a cellular network, may be coupled to a communication network element, such as a network control element 680 of a public switched telecommunication network ("PSTN"). The network control element 680 may, in turn, be formed with a processor, memory, and other electronic elements (not shown). The network control element 680 generally provides access to a telecommunication network such as a PSTN. Access may be provided using fiber optic, coaxial, twisted pair, microwave communication, or similar link coupled to an appropriate link-terminating element. A communication element 610 formed as user equipment is generally a self-contained device intended to be carried by an end user.

The processor 620 in the communication element 610, which may be implemented with one or a plurality of processing devices, performs functions associated with its operation including, without limitation, encoding and decoding (encoder/decoder 623) of individual bits forming a communication message, formatting of information, and overall control (controller 625) of the communication element 610, including processes related to management of resources (resource manager 628). Exemplary functions related to management of resources include, without limitation, hardware installation, traffic management, performance data analysis, tracking of end users and equipment, configuration management, end user administration, management of user equipment, management of tariffs, subscriptions, and billing, and the like. For instance, in accordance with the memory 650, the resource manager 628 is configured to allocate time and frequency communication resources for transmission of data to/from the communication element 610 and format messages including the communication resources therefor. The processor 620 (via, for instance, a remapper 624) further includes processes to perform bit remapping processes in accordance with a communication node (e.g., a relay node such as a base station or user equipment) as described herein. It should be understood that the term encoder/decoder 623 is applied generically to a module that can perform ones of selected functions such as, without limitation, encoding, decoding, interleaving and/or de-interleaving.

The execution of all or portions of particular functions or processes related to management of resources may be performed in equipment separate from and/or coupled to the communication element 610, with the results of such functions or processes communicated for execution to the communication element 610. The processor 620 of the communication element 610 may be of any type suitable to the local application environment, and may include one or more of general-purpose computers, special purpose computers, microprocessors, digital signal processors ("DSPs"), and processors based on a multi-core processor architecture, as non-limiting examples.

The transceiver 670 of the communication element 610 modulates information on to a carrier waveform for transmission by the communication element 610 via the antenna 660 to another communication element. The transceiver 670 demodulates information received via the antenna 660 for further processing by other communication elements.

The memory 650 of the communication element 610, as introduced above, may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 650 may include program instructions that, when executed by an associated processor, enable the communication element to perform tasks as described herein. Of course, the memory 650 may form a data buffer for data transmitted to and from the communication element 610. Exemplary embodiments of the system, subsystems, and modules as described herein may be implemented, at least in part, by computer software executable by processors of, for instance, the user equipment and the base station, or by hardware, or by combinations thereof As will become more apparent, systems, subsystems and modules may be embodied in the communication element as illustrated and described herein.

A conventional bit mapping solution for a relay node when a different order of demodulator and modulator are employed at the relay node would just sequentially map received bits into transmitted bits, as could be interpreted from 3GPP TS 36.212 v8.2.0 (2008-3), which is incorporated herein by reference, and which will be described further hereinbelow. In a conventional bit mapping solution, a demodulated codeword from a low order constellation is directly re-modulated onto a higher order constellation without reordering of the received bits.

A demodulate and forward ("DmF") mode represents a tradeoff between amplify and forward ("AF") and decode and forward ("DcF") modes or strategies. An amplify and forward relay node only amplifies and forwards the received signal, whereas a decode and forward relay node demodulates, decodes, and then re-encodes and forwards the received signal. A demodulate and forward relay node demodulates and makes hard detection decisions on received signals to form an estimated codeword before forwarding. Thus, error performance at a destination node with an intervening demodulate and forward relay node would be expected to perform better than one with an amplify and forward relay node. Processing delay at a relay node operating in the demodulate and forward mode would be less than that of a node operating in decode and forward mode due to the absence of a decoder in the demodulate and forward relay node. Therefore, demodulate and forward mode is a potentially advantageous solution for relay-enhanced wireless communication systems, especially for systems with a tight delay requirement.

Figure 7:
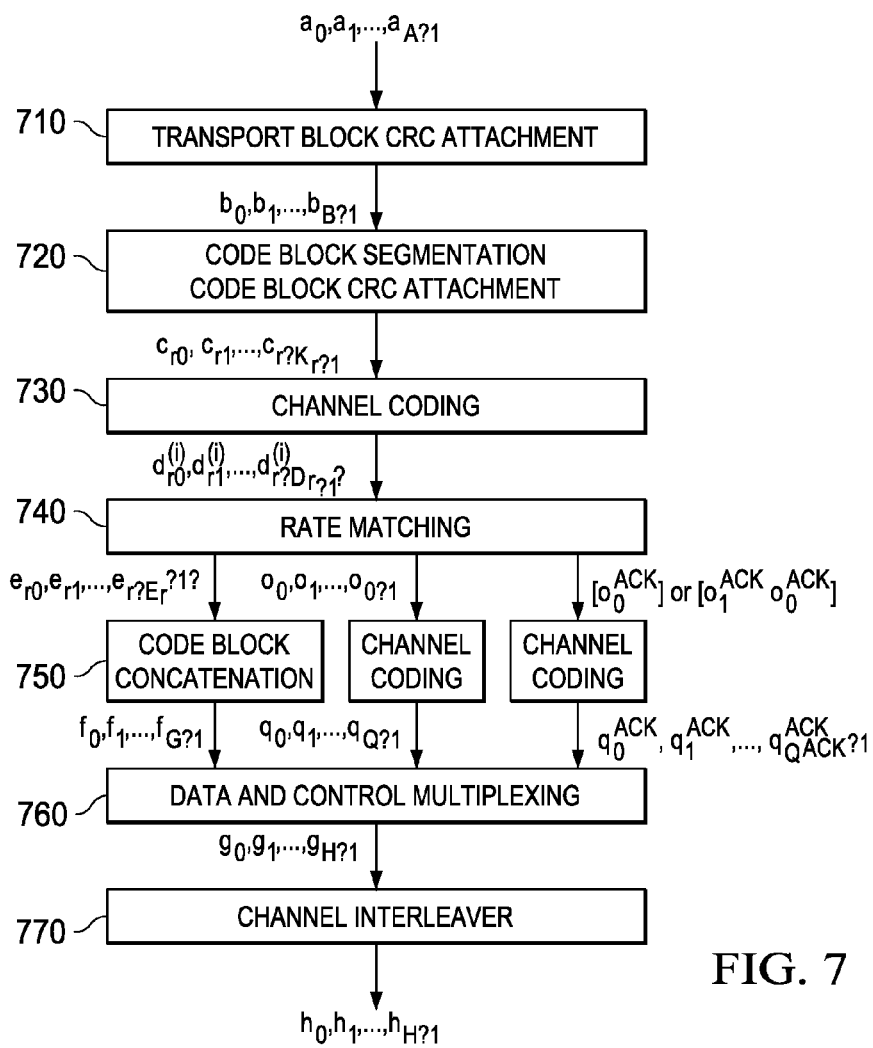
FIG. 7 illustrates a flowchart of a transport channel signal process for an uplink-shared channel.

Turning now to FIG. 7, illustrated is a flowchart of a transport channel signal process for an uplink-shared channel ("UL-SCH") that may be inferred from the 3GPP TS 36.212. It is assumed that a demodulate and forward relay node is inserted in a communication link between a source node, such as a user equipment, and a destination node, such as a base station. In a module 710, a cyclic redundancy check ("CRC") code is attached to a data word to be transmitted. In a module 720, a code block is segmented, and a cyclic redundancy check code is attached to the code block. In a module 730, the code block with the attached cyclic redundancy check code is encoded. In a module 740, the data are rate matched to the channel to provide a necessary level of redundancy in the transmitted signal. In a module 750 the code block is concatenated. In a module 760, data and control information for the channel are multiplexed. In a module 770, the multiplexed data are interleaved for transmission across a wireless communication channel. Thus, after multiplexing with encoded control signals, encoded data and control signals are interleaved together at a symbol level for protection against burst errors. Then the interleaved symbols are modulated according to a certain constellation format, and up-converted for transmission.

Turning now to FIG. 8, illustrated is a flowchart demonstrating signal processing in a demodulate and forward mode at a relay node. It is assumed here that the same modulation order (i.e., the number of bits in a modulation symbol of a constellation) is selected for both hops when a relay node is inserted in a communication link between a source node such as user equipment and a destination node such as a base station. At the source node, channel encoding is performed in a module 810, followed by symbol interleaving in a module 820 and signal modulation in a module 830. At the relay node, the signal is demodulated and hard detection decisions are made in a module 840, followed by signal re-modulation in a module 850. Since the same modulation order is used for reception and transmission at the relay node (i.e., for the two hops), no bit reordering is required for re-transmission of the signal. At the destination node, the signal is demodulated in a module 860, followed by symbol de-interleaving in a module 870, and channel decoding in a module 880. The modules or steps indicated in FIG. 8 individually perform signal processing steps well understood in the art, and will not be described in further detail.

Turning now to FIG. 9, illustrated is a flowchart demonstrating a bit mapping process in a demodulate and forward relay node when a different modulation scheme is employed for two hops that may be inferred from the 3GPP TS 36.212. When a lower order demodulation and a higher order modulation are respectively employed for the two hops, a conventional demodulation and re-modulation procedure at a relay node is employed wherein the received bits are sequentially mapped into the transmitted bits without reordering. At the source node, the signal is encoded in a module 910, followed by a symbol interleaving in a module 920, and signal modulation in a module 930. The relay node first demodulates received symbols in a module 940 according to a modulation format $Mod_1$, and makes hard detection decisions to form an estimated interleaved codeword. The modulation format or scheme refers to the complex-plane constellation describing the received or transmitted signals. Then, the estimated interleaved codeword is de-interleaved in a module 950 according to the lower order modulation format $Mod_1$ to recover the original codeword sequence. Following procedures as described in the 3GPP TS 36.212, the next module is to re-interleave the codeword in a module 960 according to the higher order modulation format $Mod_2$ for transmission by the relay node. Finally, the re-interleaved codeword is re-modulated at the relay node in a module 970 according to higher order modulation format $Mod_2$. Here, $Mod_1$ and $Mod_2$ denote, respectively, the modulation format or schemes of the first hop (the source node to the relay node) and the second hop (the relay node to the destination node), respectively. Correspondingly, the terms $M_1$ and $M_2$ denote their respective modulation orders. At the destination node, the signal is demodulated in a module 980, followed by symbol de-interleaving in a module 990, and channel decoding in a module 995. The symbol interleaving and de-interleaving can be viewed as a subgroup-wise bit-interleaver and de-interleaver, respectively, based on a modulation-based alphabet.

Returning to the relay node, when the modulation order $M_1$ is not the same as the modulation order $M_2$, especially when the modulation order $M_2$ is not an integer multiple of the modulation order $M_1$, some of the coded bits in the modulation format $Mod_1$ would be separated into different modulation format $Mod_2$ symbols. An example is now described to explain this separation phenomenon. In this example, a 16 quadrature amplitude modulation ("QAM") is selected for the first hop (i.e., one modulation symbol in a constellation of 16 symbols represents four bits), and 64 QAM is selected for the second hop (i.e., one modulation symbol in a constellation of 64 symbols represents six bits). Thus, $Mod_1$=16 QAM, $M_1$=4, $Mod_2$=64 QAM and $M_2$=6. For the sake of simplicity of explanation, only the in-phase signal component is considered. In this example, three in-phase 16 QAM components, each consisting of two bits, are mapped on to two in-phase 64 QAM components, each consisting of three bits. Following a conventional process as inferred from 3GPP TS 36.212, codes bits in each 16/64 QAM component would be sequentially mapped without reordering according to the following process.

$$\begin{array}{cccccc} s_{16QAM,1} & s_{16QAM,2} & s_{16QAM,3} & & s_{64QAM,1} & s_{64QAM,2} \\ (\ I_1\ I_2\ )( & I_3\ I_4\ )( & I_5\ I_6\ ) & \rightarrow & (I_1\ I_2\ I_3)(I_4\ I_5\ I_6) \end{array} \quad (1)$$

In the expression (1) above, the symbol $I_i$ represents an information bit to be communicated. It is observed in the expression (1) that the bits from the second 16 QAM signal are distributed across two 64 QAM signals, thereby disturbing their "integrality." Mapping the bits of one modulation symbol into another modulation symbol without distributing the bits across different modulation symbols is referred to herein as maintaining integrality. A number of issues are raised regarding a conventional solution from 3GPP TS 36.212.

The first issue raised regarding a conventional solution is maintaining integrality of transmitted symbols. Considering the first hop, bits distilled from the same modulation format $Mod_1$ components generally experience the same channel fading and noise, whereas bits distilled from a different modulation format components may experience noise and fading in uncorrelated channels. When remapping from the modulation format $Mod_1$ symbols to the modulation format $Mod_2$ symbols, a question to be addressed for reliable communication is how bits distilled from the modulation format $Mod_1$ components should be mapped into another modulation format $Mod_2$ component(s). Recall that detection of a symbol after transmission through a noisy channel includes statistical processing that assesses admissible and inadmissible bit sequences for a code word that contains deliberately inserted redundant data. Thus, an issue for reliable communication is whether the integrality of a modulation format $Mod_1$ component should be preserved as much as possible after remapping, and whether preserving the integrality of a modulation format $Mod_1$ component after remapping would bring improvement to system performance.

A second consideration is protecting the integrality of symbols. The integrality of constellation components is involuntarily preserved in the process illustrated in FIG. 9 to some degree, particularly for the same received and transmitted modulation level at a relay node. But there is often opportunity, conventionally ignored, to preserve integrality of the modulation format $Mod_1$ components when the modulation level is different.

Another consideration is treatment of differing reception reliabilities within each symbol. When the modulation order M is more than three (i.e., when a constellation symbol represents more than three bits), bits in one modulation component may have different decoding reliability. For example, when Gray code mapping (as illustrated in Table 1, wherein successive symbols are mapped into a binary code with the fewest overall number of bit changes between adjacent symbols) is adopted for 16 QAM, $I_1/Q_1$ bits would be more reliable than $I_2/Q_2$ bits, wherein the "I" bits represents the in-phase component and the "Q" represents the quadrature phase component. This is also true for Gray code mapping 64 QAM (as illustrated in Table 2). In other words, the reliability is in a regressive order from $I_1/Q_1$ to $I_2/Q_2$, in which $I_1I_2/Q_1Q_2$ are the two most reliable bits (including the most significant bit and the middle significant bit) in each component. Computation of the reliability of correctly receiving a transmitted bit in a constellation symbol transmitted across a noisy communication channel is well understood in the art, and will not be further described herein in the interest of brevity.

It can be seen that in a conventional bit mapping scheme in accordance with expression (1), an integral 16 QAM component is not mapped on to the two most reliable positions in a 64 QAM component (e.g., bits $I_5I_6$ are conventionally mapped on to the two least reliable positions (middle significant bit and the least significant bit) in a 64 QAM component). Notice that in 64 QAM as illustrated in Table 2, the most significant bit when it is "0" is mapped entirely into the left-half signal constellation plane, and the most significant bit when it is "1" is mapped entirely into the right-half signal constellation plane, which provides the most reliable signal detection opportunity. Such wide separation of bits in the constellation does not occur for the middle significant bit or the least significant bit. This mapping rule would thus weaken the final equivalent reliability of the integral 16 QAM components at the destination. This phenomenon will be addressed and will be improved on as described further hereinbelow.

TABLE 1

| Gray Code Mapping for 16 QAM | |
|---|---|
| $I_1I_2$ ($Q_1Q_2$) | Constellation Point |
| 00 | $-3/\sqrt{10}(j)$ |
| 01 | $-1/\sqrt{10}(j)$ |
| 11 | $1/\sqrt{10}(j)$ |
| 10 | $3/\sqrt{10}(j)$ |

In Table 1 above and in Table 2 below, the in-phase data are mapped onto the real axis, and quadrature data are mapped onto the imaginary axis as represented by entries in parentheses.

Another issue for reliable communication is how to treat different symbols. To be reliably decoded at a destination node, each symbol from the first hop should be treated equally at the relay node. In addition to the factors described above, a balance between the modulation format $Mod_1$ symbols should be taken into account.

TABLE 2

Gray Code Mapping for 64 QAM

| $I_1I_2I_3$ ($Q_1Q_2Q_3$) | Constellation Point |
|---|---|
| 000 | $-7/\sqrt{42}(j)$ |
| 001 | $-5/\sqrt{42}(j)$ |
| 011 | $-3/\sqrt{42}(j)$ |
| 010 | $-1/\sqrt{42}(j)$ |
| 110 | $1/\sqrt{42}(j)$ |
| 111 | $3/\sqrt{42}(j)$ |
| 101 | $5/\sqrt{42}(j)$ |
| 100 | $7/\sqrt{42}(j)$ |

As introduced herein, a remapping process at a relay node is described when modulation modes of two hops for a communication link or path are different.

Figure 10:
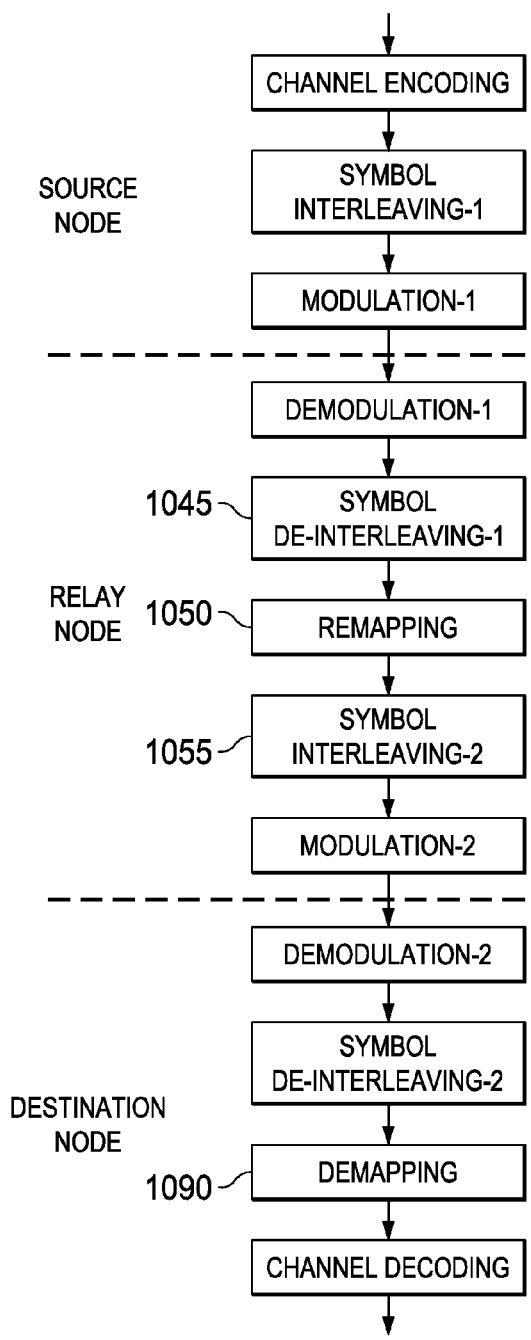
FIGS. 10 and 11, illustrated are flowcharts demonstrating embodiments of a bit remapping processes when modulation schemes of two hops for a received signal and a transmitted signal at a relay node are different according to the principles of the present invention.
Figure 11:
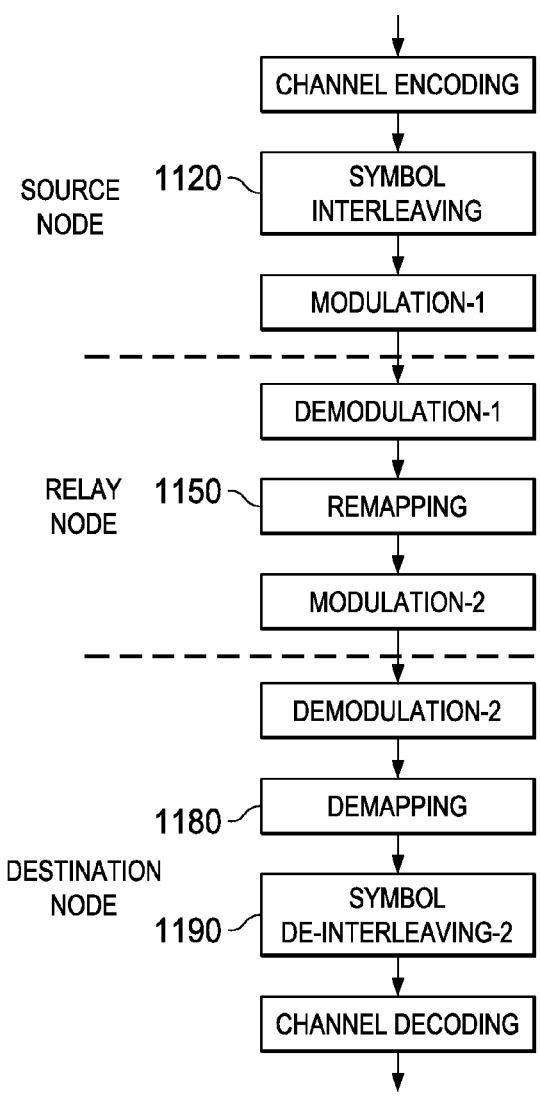

Turning now to FIGS. 10 and 11, illustrated are flowcharts demonstrating embodiments of a bit remapping process when modulation schemes of two hops for a received signal and a transmitted signal at a relay node are different according to the principles of the present invention. In addition to the modules or steps mentioned above at a relay node, a bit remapping module 1050 is now inserted between a symbol de-interleaving module 1045 and a symbol interleaving module 1055, and is described further hereinbelow. Additionally, a bit demapping module 1090 is inserted at a destination node.

Regarding FIG. 11, illustrated is a simplified process of a remapping process according to the principles of the present invention. As illustrated in FIG. 11, the source node now contains a symbol interleaving module 1120. While the relay node includes a remapping module 1150, the relay node does not include the interleaving and a de-interleaving modules. Omission of these modules or steps in the relay node may provide a reduction of latency delay associated with signal processing. Additionally, the order of demapping module 1180 and de-interleaving module 1190 at the destination node has now been interchanged in comparison to the remapping process illustrated with respect to FIG. 10. Additionally, $Mod_1$ and $Mod_2$ denote, respectively, the modulation format or schemes of a first hop (the source node to the relay node) and a second hop (the relay node to the destination node), respectively. Correspondingly, the terms $M_1$ and $M_2$ denote their respective modulation orders.

The remapping process as introduced herein includes three considerations or factors, which are considered and taken as a whole. When two or more factors conflict with each other, they may be considered in priority order, beginning with the first rule recited below having highest priority.

The first rule is to protect the most significant bit of the modulation format $Mod_1$ symbols. This means that if bit $I_i$ is in a more reliable position than bit $I_j$ in the modulation format $Mod_1$ symbols, then after remapping on to the modulation format $Mod_2$ symbols, bit $I_i$ is mapped into a more reliable position than bit $I_j$. Stated more generally, bit $I_i$ is not mapped into a less reliable position than bit $I_j$. The second rule is to preserve integrality of the bits in a modulation symbol. Preserve the integrality of bits in the modulation format $Mod_1$ symbols, and then protect the integrality of bits in modulation format $Mod_1$ symbols at a more reliable position, if possible, in the modulation format $Mod_2$ symbols.

The third rule is to maintain equilibrium for the bits in modulation format $Mod_1$ symbols. This means that based on the above two rules, each modulation format $Mod_1$ symbol is treated equally. For example, when $Mod_1=64$ QAM and $Mod_2=256$ QAM, although the first remapping process illustrated below is strictly in accordance with rule 1 and rule 2, the performance of the second remapping process illustrated below is better than that of the first. If each 64 QAM symbol has the same reliability, in the second remapping process, equivalent performance of $S_{64QAM}$ at the destination is not maintained as a result of the splitting. The split bits should be mapped on to more reliable positions in 256 QAM symbols. Thus, equilibrium among each modulation format $Mod_1$ symbol is important.

$$S_{64QAM,1} \ S_{64QAM,2} \ S_{64QAM,3} \ S_{64QAM,4}$$
$$(I_1 \ I_2 \ I_3)(I_4 \ I_5 \ I_6)(I_7 \ I_8 \ I_9)(I_{10} \ I_{11} \ I_{12}) \rightarrow$$
$$S_{256QAM,1} \ S_{256QAM,2} \ S_{256QAM,2}$$
$$(I_1 \ I_2 \ I_3 \ I_{10})(I_4 \ I_5 \ I_6 \ I_{11})(I_7 \ I_8 \ I_9 \ I_{12})$$

$$S_{64QAM,1} \ S_{64QAM,2} \ S_{64QAM,3} \ S_{64QAM,4}$$
$$(I_1 \ I_2 \ I_3)(I_4 \ I_5 \ I_6)(I_7 \ I_8 \ I_9)(I_{10} \ I_{11} \ I_{12}) \rightarrow$$
$$S_{256QAM,1} \ S_{256QAM,2} \ S_{256QAM,2}$$
$$(I_{10} \ I_1 \ I_2 \ I_3)(I_{11} \ I_4 \ I_5 \ I_6)(I_7 \ I_8 \ I_9 \ I_{12})$$

Bit remapping schemes for $Mod_1=64$ QAM and $Mod_2=256$ QAM are illustrated in Table 3 below.

TABLE 3

Bit Remapping Processes for $Mod_1$ = 64 QAM and $Mod_2$ = 256 QAM

| Modulations | $Mod_1$ = 64 QAM, $Mod_2$ = 256 QAM |
|---|---|
| Optimum remapping schemes | (10 1 2 3) (11 4 5 6) (7 8 9 12); (10 1 2 3) (4 5 6 11) (7 8 9 12); their equivalents. |
| Other potential promising schemes | (1 2 3 10) (4 5 6 11) (7 8 9 12); (1 2 10 3) (4 5 11 6) (7 8 9 12); (1 2 10 3) (4 5 6 11) (7 8 9 12); (10 1 2 3) (11 4 5 6) (12 7 8 9); (1 2 3 9) (4 5 6 12) (7 10 11 8); (1 2 3 9) (4 5 6 12) (7 8 10 11); (7 1 2 3) (10 4 5 6) (8 11 12 9); their equivalents; other schemes which take the three remapping rules into account as a whole. |

If the communication channel for each modulation format $Mod_1$ symbol is different (i.e., if each modulation format $Mod_1$ symbol has different reliability), communication channel effects such as an increased noise level should be taken into account. For example, in an OFDM system, the modulation format $Mod_1$ symbols in deeply faded subcarriers should be split on to different modulation format $Mod_2$ symbols. Implementation of these rules will now be described for the exemplary case of $Mod_1=16$ QAM, and $Mod_2=64$ QAM, and a comparison among several remapping processes as introduced herein will be made.

Figure 12:
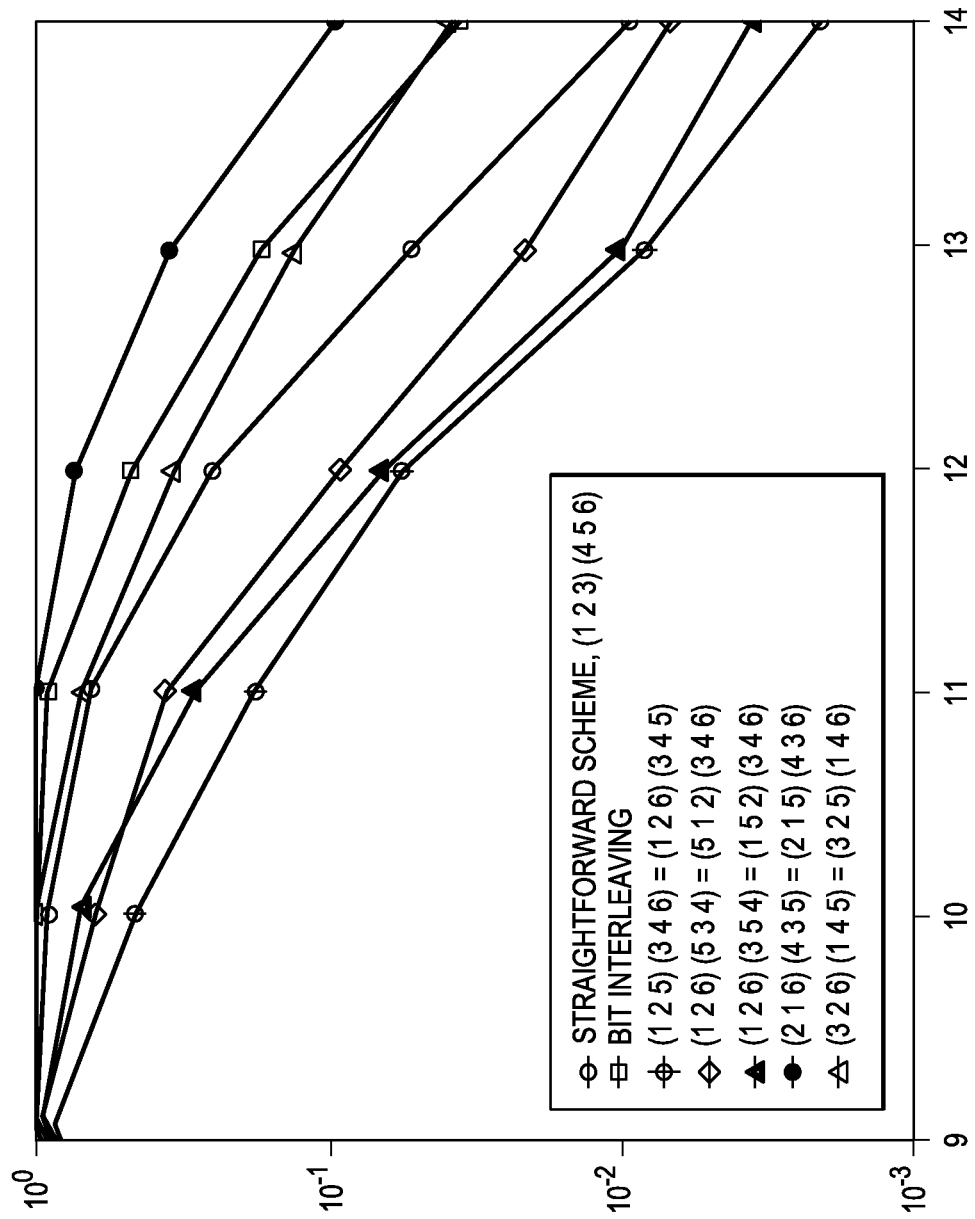
FIGS. 12 and 13, illustrated are graphical representations demonstrating exemplary performance parameters of remapping processes according to the principles of the present invention.
Figure 13:
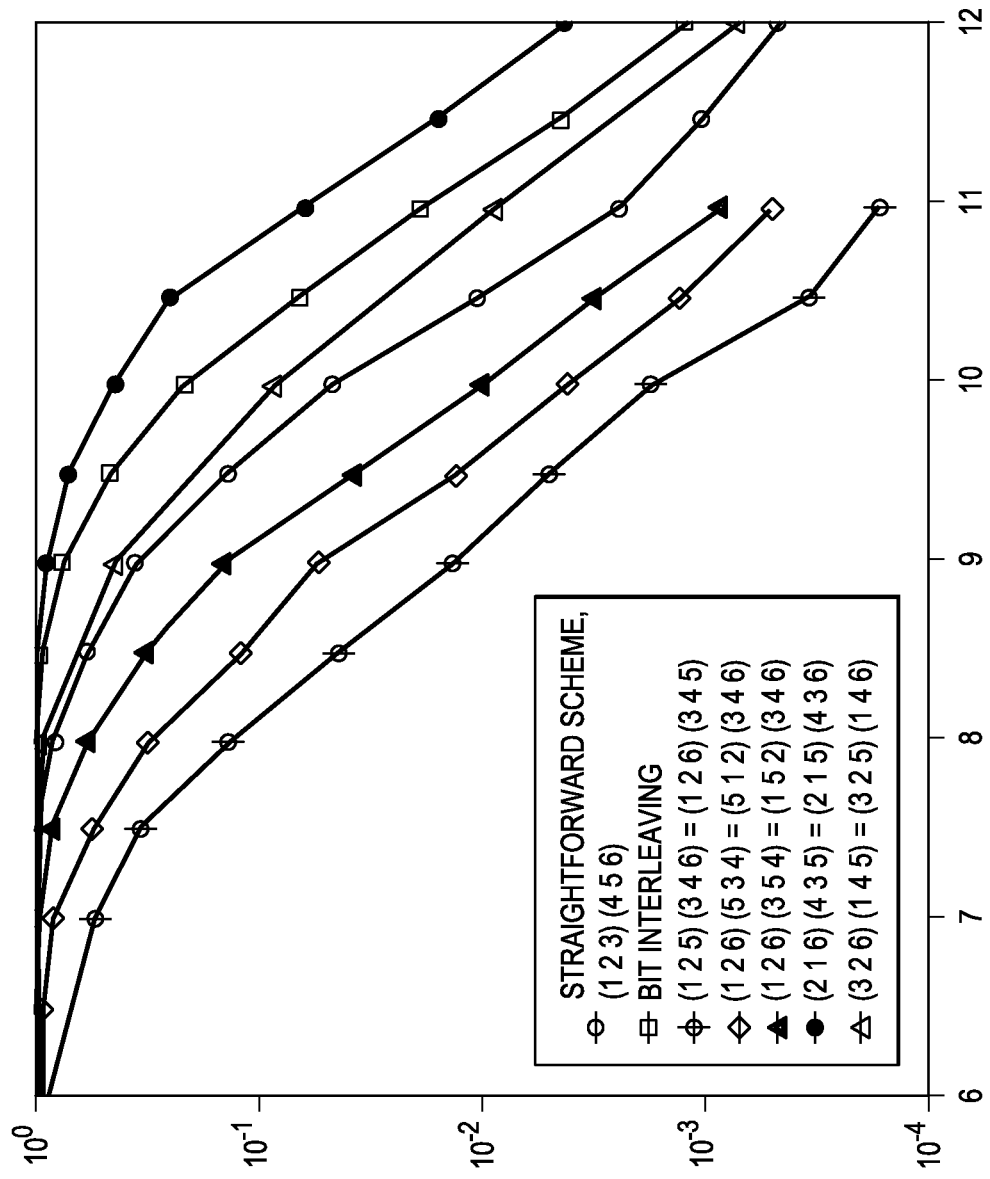

Turning now to FIGS. 12 and 13, illustrated are graphical representations demonstrating exemplary performance parameters of remapping processes according to the principles of the present invention. Beginning with FIG. 12, illustrated is a graphical representation of a frame error rate ("FER") of several bit remapping processes when $Mod_1=16$ QAM, $Mod_2=64$ QAM, and the signal to noise ratio ("SNR") of the second hop is 10 decibels ("dB"). The expression (1 2 3) (4 5 6) in FIGS. 12 and 13 represents the bit mapping between the modulation symbols as illustrated by the conventional bit mapping expression (2) below.

$$S_{16QAM,1} \ S_{16QAM,2} \ S_{16QAM,3} \quad S_{64QAM,1} \ S_{64QAM,2} \qquad (2)$$
$$(\ I_1 \ I_2\ )(\ I_3 \ I_4\ )(\ I_5 \ I_6\ ) \rightarrow (I_1 \ I_2 \ I_3)(I_4 \ I_5 \ I_6)$$

The sign "=" in FIGS. 12 and 13 indicates that the two operations on both sides of the sign "=" have the same performance or equivalent effect. Selected parameters are listed below in Table 4. The corresponding curves when the signal to noise ratio of the second hop is 18 dB are illustrated in FIG. 13. As illustrated in FIGS. 12 and 13, a bit remapping process as introduced herein provides a significant level of frame error rate improvement over a substantial range of signal to noise ratio.

TABLE 4

Selected Parameters

| | |
|---|---|
| Modulation of the 1$^{st}$ hop | Mod$_1$ = 16 QAM, M$_1$ = 4 |
| Modulation of the 2$^{nd}$ hop | Mod$_2$ = 64 QAM, M$_2$ = 6 |
| Channel model | AWGN for both the 1$^{st}$ and 2$^{nd}$ hop |
| Channel code parameters | ⅓ Turbo code, [11 13]$_{oct}$ |
| Channel code length | k = 320, n = 972 |
| SNR (Es/No) of 2$^{nd}$ hop | 10 dB, 18 dB |

Referring to FIG. 12, an optimum bit remapping process is (1 2 5) (3 4 6)=(1 2 6) (3 4 5). This remapping process outperforms a conventional solution inferred from the 3GPP TS 36.212 by about 1.5 dB when the bit error rate is 0.1. In this remapping process, integrality of $S_{16QAM,1}$ and $S_{16QAM,2}$ are preserved and mapped onto the two most reliable positions of 64 QAM symbols. Bits of the split symbol $I_5I_6$ are allocated to the least significant bits of the 64 QAM symbols. Two other bit remapping processes, (1 2 6) (5 3 4) and (1 2 6) (3 5 4), also produce a favorable level of performance. These other processes substantially conform to the three rules introduced hereinabove.

Figure 14:
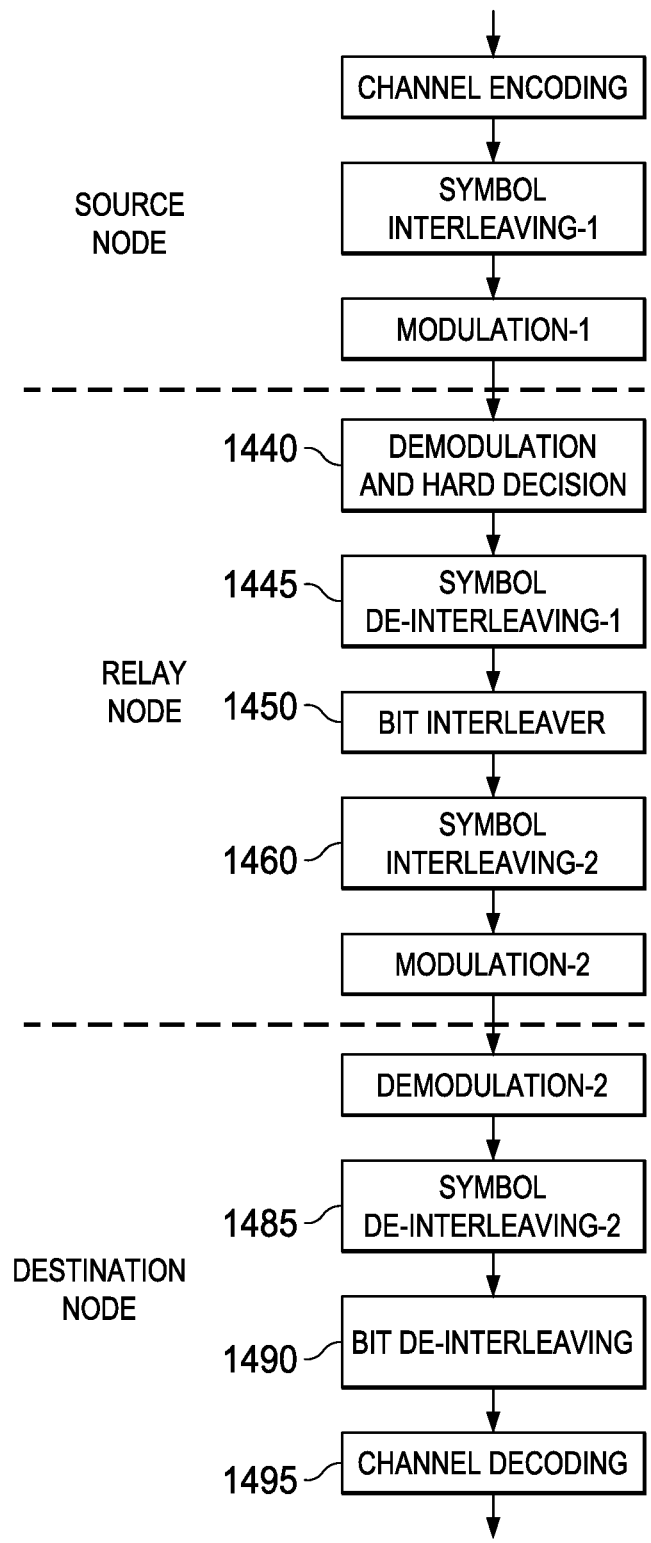
FIG. 14 illustrates a flowchart demonstrating an embodiment of a bit interleaving process when modulation schemes of two hops for a received signal and a transmitted signal at a relay node are different according to the principles of the present invention.

Turning now to FIG. 14, illustrated is a flowchart demonstrating an embodiment of a bit interleaving process when modulation schemes of two hops for a received signal and a transmitted signal at a relay node are different according to the principles of the present invention. The bit interleaving process provides a benchmark for performance comparison employable with a bit remapping process in accordance with the principles of the present invention. A characteristic of the bit interleaving process illustrated in FIG. 14 is that a bit interleaver module 1450 is inserted in the relay node between a symbol de-interleaving-1 module 1445 and a symbol inter-leaving-2 module 1460. As illustrated in FIG. 14, the relay node now contains a demodulation and hard-decision module 1440 and the bit interleaver module 1450. The destination node now contains a bit de-interleaving module 1490 inserted between a symbol de-interleaving-2 module 1485 and a channel-decoding module 1495. A function of the bit interleaving module 1450 is to rearrange bits randomly. Other bit interleaving processes can be similarly constructed.

An optimum and several alternative bit remapping processes, constructed in accordance with embodiments of the present invention, are listed below in Table 5.

TABLE 5

Bit Remapping Processes for Mod$_1$ = 16 QAM and Mod$_2$ = 64 QAM

| | |
|---|---|
| Modulation | Mod$_1$ = 16 QAM, Mod$_2$ = 64 QAM |
| Optimum remapping scheme | (1 2 6) (3 4 5) = (1 2 5) (3 4 6) and its equivalent |
| Other promising schemes | (1 2 6) (5 3 4) = (1 2 5) (6 3 4); (1 2 6) (3 5 4) = (1 2 5) (3 6 4); their equivalents; other schemes that take the three remapping rules into account as a whole. |

Implementation of the optimum bit remapping process (1 2 6) (3 4 5) is now described as an exemplary embodiment. The implementation includes four important elements and steps. The first step includes preserving the integrality of the largest number of 16 QAM symbols. If the number of 16 QAM symbols is $N_1$, the number of 64 QAM symbols is $N_2=(\frac{2}{3})N_1$, recalling that a 16 QAM symbol represents four bits and a 64 QAM symbol represents six bits. Only 2N$_2$ 16 QAM bits (including N$_2$ in-phase bits and N$_2$ quadrature bits) can be kept integral, while the remaining $2N_2'=(\frac{2}{3})N_1$ 16 QAM bits should be split.

The second step includes mapping the 2N$_2$ integral 16 QAM bits on to the most significant bit and the middle significant bit of each 64 QAM component. According to the third step, when remapping the integral 16 QAM bits, rule 1 should be followed. In other words, if bit I$_1$ and bit I$_2$ are the most significant bit and the least significant bit of a 16 QAM component, then bit I$_1$ should be mapped as the most significant bit of the 64 QAM component and bit I$_2$ should be mapped as the middle significant bit of this component. The fourth step includes mapping the other 2N$_2$' split 16 QAM bits onto the least significant bit of each 64 QAM component.

A simplified process, constructed according to an embodiment, to reduce latency delay by the proposed remapping processes has been introduced herein. Recognizing that latency delay at a relay node is generally a consequence of bit processing, a simplified process to simplify processing at a relay node is to omit the symbol de-interleaver 1 module and the symbol interleaver 2 module as illustrated in FIG. 11. The symbol de-interleaver module 1190 at the destination node is designed according to the modulation format Mod$_1$ and the demapping module 1180 is inserted therein. To execute symbol de-interleaver 1 at the destination node accurately, a relay node forwards information about the structure of modulation format Mod$_1$ to the destination node, which requires additional signals to carry this further information. In this simplified arrangement, bits can be remapped and re-modulated as soon as modulation order M$_2$ bits are received without receiving the whole codeword. This may further reduce processing delay at a relay node. Performance of the optimum remapping scheme (1 2 3) (4 5 6)→(1 2 6) (3 4 5) under other coding rates and other coding modes can be demonstrated by numerical calculation.

Thus, with reference to FIG. 6 introduced above, an apparatus (e.g., relay node such as a base station or user equipment) 610 includes a processor 620 (via, for instance, a remapper 624) configured to remap an order of bits of a received signal from a source node (e.g., user equipment) to a different order of bits for a transmitted signal to a destination node (e.g., a base station) when the transmitted signal is constructed with a modulation scheme different from the received signal. The processor 620 (via, for instance, the remapper 624) may maintain integrality of bits between the received and transmitted signals in accordance with remapping the order of bits of the received signal to the different order of bits for the transmitted signal. Additionally, the processor 620 (via, for instance, the remapper 624) is configured to remap bits of a constellation associated with the received signal having a highest reliability into bits of a constellation associated with the transmitted signal having a highest reliability. As an example, if the received signal is constructed with a 16 QAM scheme and the transmitted signal is constructed with a 256 QAM scheme, the order of bits of the received signal is (1 2 3) (4 5 6) (7 8 9) (10 11 12) and the different order of bits for the transmitted signal is one of (10 1 2 3) (11 4 5 6) (7 8 9 12) and (10 1 2 3) (4 5 6 11) (7 8 9 12). As another example, if the received signal is constructed with a 16 QAM scheme and the transmitted signal is constructed with a 64 QAM scheme, the order of bits of the received signal is (1 2) (3 4) (5 6) and the different order of bits for the transmitted signal is one of (1 2 6) (3 4 5) and (1 2 5) (3 4 6).

The processor 620 (via, for instance, an encoder/decoder 623) is also configured to de-interleave symbols formed by bits of the received signal prior to remapping the order of bits of the received signal and interleave symbols formed by bits of the transmitted signal after remapping the order of bits of the received signal to the different order of bits for the transmitted signal. The relay node 610 also includes a transceiver 670 configured to demodulate the received signal prior to remapping the order of bits of the received signal and modulate the transmitted signal after remapping the order of bits of the received signal to the different order of bits for the transmitted signal.

Figure 15:
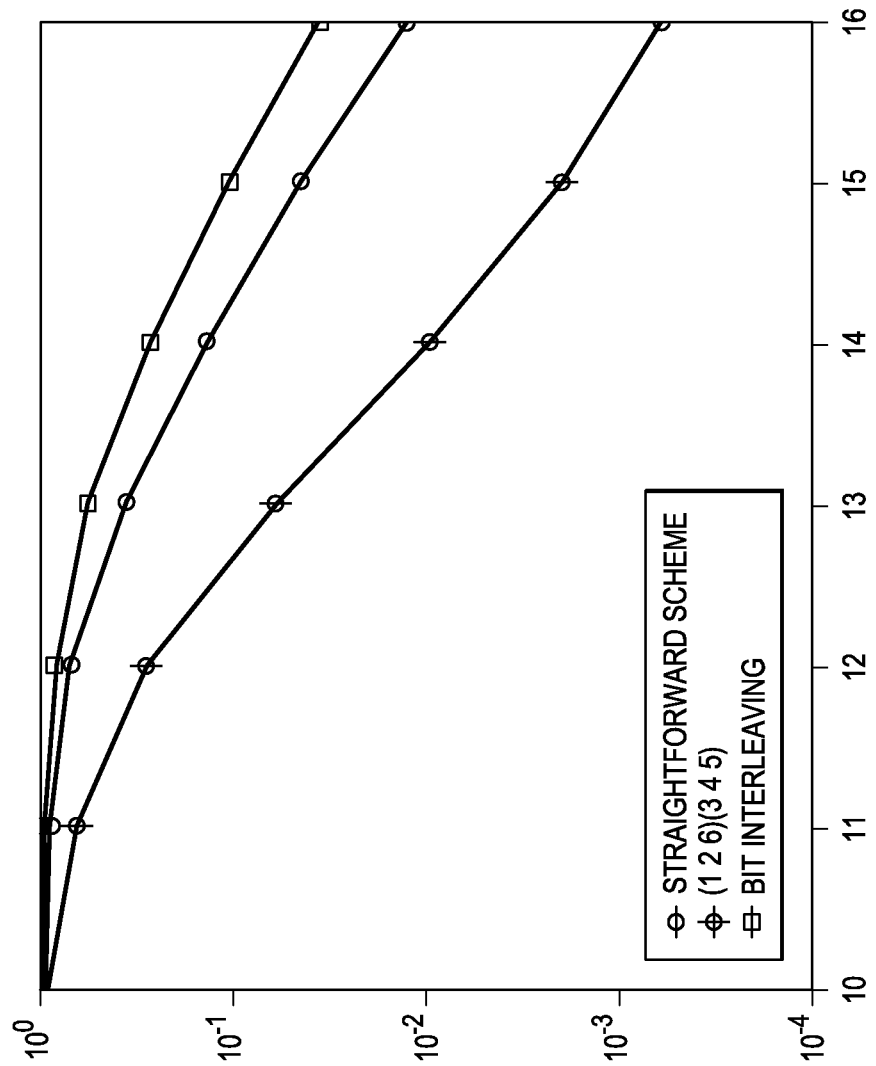
FIGS. 15 to 19 illustrate graphical representations demonstrating exemplary performance parameters of remapping processes according to the principles of the present invention.
Figure 16:
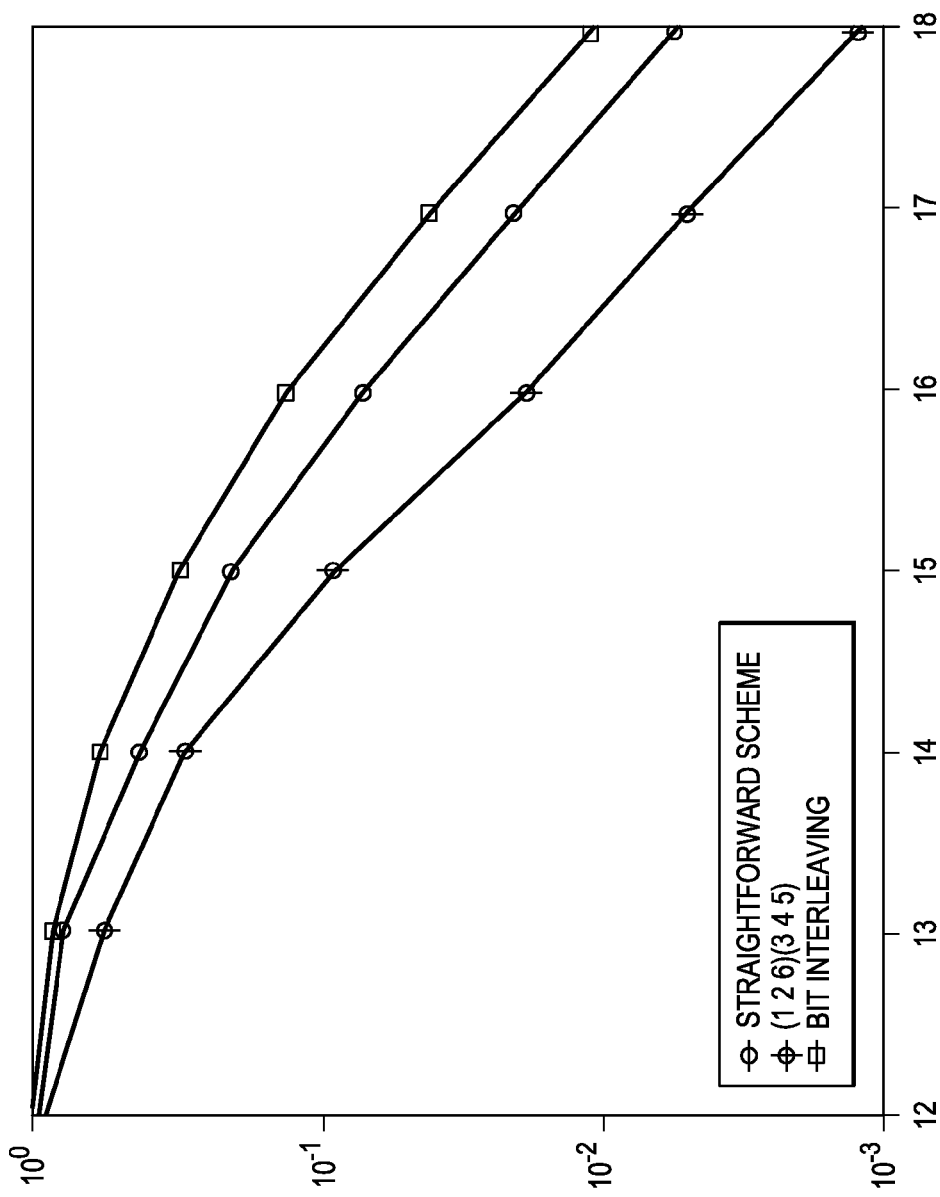
Figure 17:
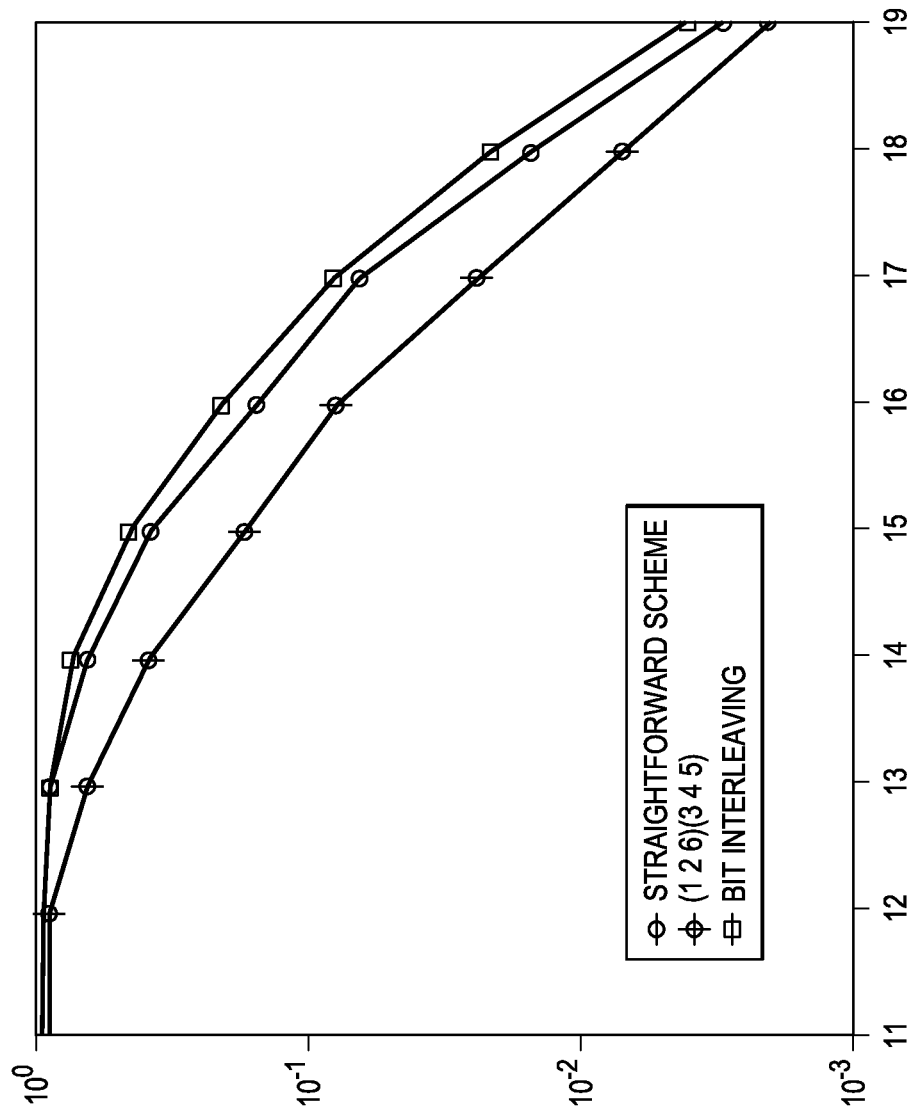

Turning now to FIGS. 15 to 19, illustrated are graphical representations demonstrating exemplary performance parameters of remapping processes according to the principles of the present invention. More specifically, FIG. 15 provides exemplary results of a frame error rate performance according to a remapping process with $Mod_1$=16 QAM, $Mod_2$=64 QAM, for a rate 1/2 turbo code when the signal to noise ratio of the second hop is 15 dB, and FIG. 16 provides exemplary results of a frame error rate performance according to a remapping process with $Mod_1$=16 QAM, $Mod_2$=64 QAM, for a 2/3 turbo code when the signal to noise ratio of the second hop is 18 dB. Other selected parameters can be found in Table 4. FIG. 17 provides exemplary results of a frame error rate performance according to a remapping process with $Mod_1$=16 QAM, $Mod_2$=64 QAM, for a 1/2 rate conventional code when the signal to noise ratio of the second hop is 18 dB. These curves illustrate that an optimum remapping process outperforms other processes in the illustrated cases.

Following the three bit remapping rules introduced hereinabove, some promising alternative remapping schemes are compared for the case of $Mod_1$=16 QAM and $Mod_2$=256 QAM. In this case, two 16 QAM symbols are mapped to one 256 QAM symbol, recognizing that one 16 QAM symbol represents four bits, and one 256 QAM symbol represents precisely twice as many bits. A conventional solution for an in-phase or quadrature component based on the 3GPP TS 36.212 is represented by expression (3) below.

$$\begin{pmatrix} s_{16QAM,1} & s_{16QAM,2} \\ I_1 \; I_2 \end{pmatrix}\begin{pmatrix} \\ I_3 \; I_4 \end{pmatrix} \rightarrow \begin{pmatrix} s_{256QAM,1} \\ I_1 \; I_2 \; I_3 \; I_4 \end{pmatrix} \quad (3)$$

Figure 18:
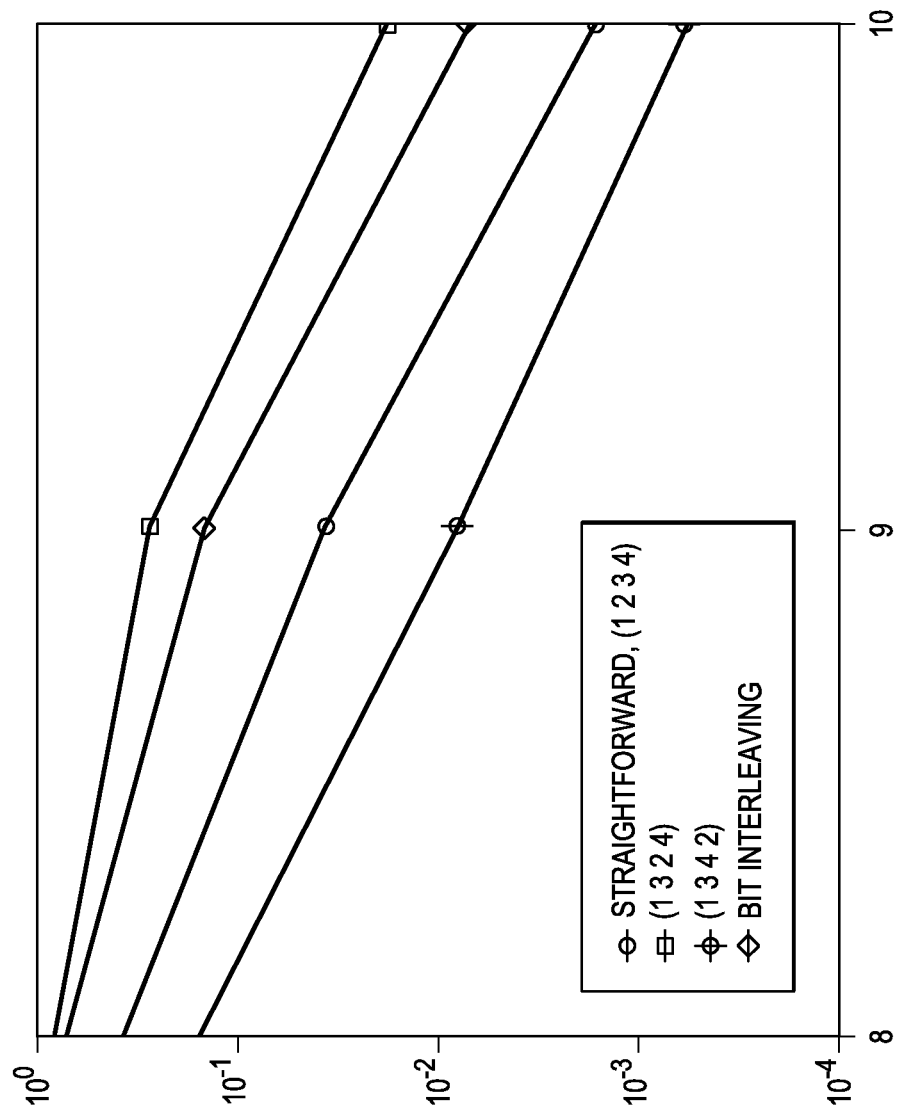

Two schemes shown in expressions (4a) and (4b) below are compared with a conventional solution based on the 3GPP TS 36.212. A frame error rate performance according to a remapping process with $Mod_1$=16 QAM, $Mod_2$=256 QAM, for a 1/3 rate turbo code when the signal to noise ratio of the second hop is 25 dB is shown in FIG. 18. Results describing comparison of the bit remapping processes are presented in Table 6 below.

Among these bit remapping processes, the optimum is (1 2) (3 4)→(1 3 4 2), which best combines the three rules. The conventional solution (1 2) (3 4)→(1 2 3 4) that preserves integrality of all the 16 QAM symbols and protects half the number of integral 16 QAM symbols, also provides reasonably good performance.

$$\begin{pmatrix} s_{16QAM,1} & s_{16QAM,2} \\ I_1 \; I_2 \end{pmatrix}\begin{pmatrix} \\ I_3 \; I_4 \end{pmatrix} \rightarrow \begin{pmatrix} s_{256QAM,1} \\ I_1 \; I_3 \; I_2 \; I_4 \end{pmatrix} \quad (4a)$$

$$\begin{pmatrix} s_{16QAM,1} & s_{16QAM,2} \\ I_1 \; I_2 \end{pmatrix}\begin{pmatrix} \\ I_3 \; I_4 \end{pmatrix} \rightarrow \begin{pmatrix} s_{256QAM,1} \\ I_1 \; I_3 \; I_4 \; I_2 \end{pmatrix} \quad (4b)$$

TABLE 6

Bit Remapping Processes for $Mod_1$ = 16 QAM and $Mod_2$ = 256 QAM

| Modulation | $Mod_1$ = 16 QAM, $Mod_2$ = 256 QAM |
|---|---|
| Optimum remapping scheme | (1 3 4 2) = (3 1 2 4) and its equivalent |
| Other potential promising schemes | (1 2 3 4) = (3 4 1 2); its equivalents; other schemes which take the 3 remapping rules into account as a whole. |

Several remapping processes are now compared for the exemplary case of $Mod_1$=64 QAM, and $Mod_2$=256 QAM constructed according to an embodiment of the present invention. In this case, four 64 QAM symbols are mapped onto three 256 QAM symbols. The 3GPP TS 36.212 conventional solution is (1 2 3 4) (5 6 7 8) (9 10 11 12), which is represented below by expression (5).

$$\begin{pmatrix} s_{64QAM,1} & s_{64QAM,2} & s_{64QAM,3} & s_{64QAM,4} \\ I_1 \; I_2 \; I_3 \end{pmatrix}\begin{pmatrix} \\ I_4 \; I_5 \; I_6 \end{pmatrix}\begin{pmatrix} \\ I_7 \; I_8 \; I_9 \end{pmatrix}\begin{pmatrix} \\ I_{10} \; I_{11} \; I_{12} \end{pmatrix} \rightarrow \quad (5)$$

$$\begin{pmatrix} s_{256QAM,1} & s_{256QAM,2} & s_{256QAM,3} \\ I_1 \; I_2 \; I_3 \; I_4 \end{pmatrix}\begin{pmatrix} \\ I_5 \; I_6 \; I_7 \; I_8 \end{pmatrix}\begin{pmatrix} \\ I_9 \; I_{10} \; I_{11} \; I_{12} \end{pmatrix}$$

Figure 19:
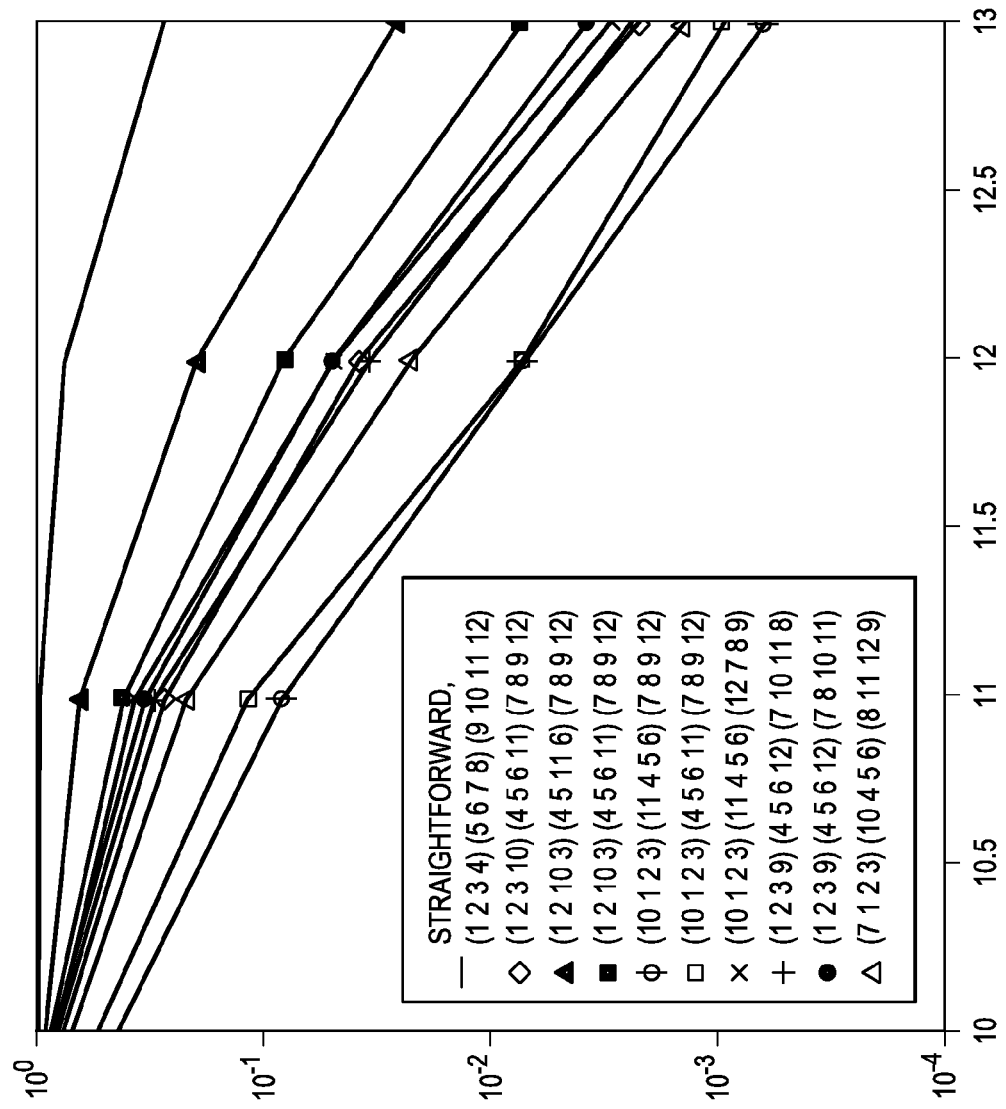

Several bit remapping processes are now compared with the conventional scheme. The frame error rate performance according to a remapping process with $Mod_1$=16 QAM, $Mod_2$=256 QAM, for a 1/3 rate turbo code when the signal to noise ratio of the second hop is 25 dB is shown in FIG. 19.

Two optimum bit remapping processes are (1 2 3) (4 5 6) (7 8 9) (10 11 12)→(10 12 3) (11 4 5 6) (7 8 9 12) and (1 2 3) (4 5 6) (7 8 9) (10 11 12) (10 12 3) (4 5 6 11) (7 8 9 12). Both of these processes preserve a maximum number of integral 64 QAM symbols (three integral symbols in every four 64 QAM symbols). Besides protecting the integral 64 QAM symbols, the two processes account for equilibrium. The optimum bit remapping processes and other promising processes are listed in Table 7. Without exception, all the processes constructed according to embodiments of the present invention preserve and protect two or three integral symbols in every four 64 QAM symbols, and then treat fairly every 64 QAM symbol.

TABLE 7

Bit Remapping Processes for $Mod_1$ = 64 QAM and $Mod_2$ = 256 QAM

| Modulations | $Mod_1$ = 64 QAM, $Mod_2$ = 256 QAM |
|---|---|
| Optimum remapping scheme | (10 1 2 3) (11 4 5 6) (7 8 9 12); (10 1 2 3) (4 5 6 11) (7 8 9 12); their equivalent. |
| Other potential promising schemes | (1 2 3 10) (4 5 6 11) (7 8 9 12); (1 2 10 3) (4 5 11 6) (7 8 9 12); (1 2 10 3) (4 5 6 11) (7 8 9 12); (10 1 2 3) (11 4 5 6) (12 7 8 9); (1 2 3 9) (4 5 6 12) (7 10 11 8); (1 2 3 9) (4 5 6 12) (7 8 10 11); (7 1 2 3) (10 4 5 6) (8 11 12 9); their equivalents; other schemes which take the three remapping rules into account as a whole. |

The bit remapping processes introduced herein may improve frame error rate performance significantly without introducing implementation complexity, and may be executed with less processing delay. These bit remapping processes may introduce insubstantial additional hardware or additional control signaling, etc., on a remapping function at a relay node, and may be implemented in software. It should be understood that selected steps of the method of operating the communication system may be reordered or omitted, or other steps may be added thereto, and still fall within the broad scope of the present invention.

In addition, program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM ("EROM"), a floppy diskette, a compact disk CD-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising a processor configured to remap an order of bits of a received signal from a source node to a different order of the bits for a transmitted signal to a destination node when said transmitted signal is constructed with a first modulation scheme different from said received signal constructed with a second different modulation scheme, wherein said first modulation scheme comprises a symbol having a first number of bits and said second modulation scheme comprises a symbol having a different second number of bits.

2. The apparatus as recited in claim 1 wherein said processor is configured to de-interleave symbols formed by bits of said received signal prior to remapping said order of bits of said received signal.

3. The apparatus as recited in claim 1 wherein said processor is configured to interleave symbols formed by bits of said transmitted signal after remapping said order of bits of said received signal to said different order of bits for said transmitted signal.

4. The apparatus as recited in claim 1 further comprising a transceiver configured to demodulate said received signal prior to remapping said order of bits of said received signal.

5. The apparatus as recited in claim 1 further comprising a transceiver configured to modulate said transmitted signal after remapping said order of bits of said received signal to said different order of bits for said transmitted signal.

6. The apparatus as recited in claim 1 wherein said processor maintains integrality of bits between said received and transmitted signals in accordance with remapping said order of bits of said received signal to said different order of bits for said transmitted signal.

7. The apparatus as recited in claim 1 wherein said processor is configured to protect a most significant bit of and maintain an equilibrium of bits of said received signal in accordance with remapping said order of bits of said received signal to said different order of bits for said transmitted signal.

8. The apparatus as recited in claim 1 wherein said received signal is constructed with a 16 quadrature amplitude modulation scheme and said transmitted signal is constructed with a 256 quadrature amplitude modulation scheme, said order of bits of said received signal is (1 2 3) (4 5 6) (7 8 9) (10 11 12) and said different order of bits for said transmitted signal is one of (10 1 2 3) (11 4 5 6) (7 8 9 12) and (10 1 2 3) (4 5 6 11) (7 8 9 12).

9. The apparatus as recited in claim 1 wherein said received signal is constructed with a 16 quadrature amplitude modulation scheme and said transmitted signal is constructed with a 64 quadrature amplitude modulation scheme, said order of bits of said received signal is (1 2) (3 4) (5 6) and said different order of bits for said transmitted signal is one of (1 2 6) (3 4 5) and (1 2 5) (3 4 6).

10. The apparatus as recited in claim 1 wherein said apparatus forms a portion of a relay node within one of a base station and user equipment of a communication system.

11. An apparatus comprising means for remapping an order of bits of a received signal from a source node to a different order of bits for a transmitted signal to a destination node when said transmitted signal is constructed with a first modulation scheme different from said received signal constructed with a second modulation scheme, wherein a symbol of said first modulation scheme is formed from a different number of bits from a symbol of said second modulation scheme.

12. The apparatus as recited in claim 11, further comprising:
- means for de-interleaving symbols formed by bits of said received signal prior to remapping said order of bits of said received signal; and
- means for interleaving symbols formed by bits of said transmitted signal after remapping said order of bits of said received signal to said different order of bits for said transmitted signal.

13. A computer program product comprising a program code stored in a non-transitory computer readable medium configured to remap an order of bits of a received signal from a source node to a different order of the bits for a transmitted signal to a destination node when said transmitted signal is constructed with a first modulation scheme different from said received signal constructed with a second different modulation scheme, wherein said first modulation scheme comprises a symbol having a first quantity of bits and said second modulation scheme comprises a symbol having a different second quantity of bits.

14. The computer program product as recited in claim 13 wherein said program code stored in said computer readable medium is configured to:
- de-interleave symbols formed by bits of said received signal prior to remapping said order of bits of said received signal; and
- interleave symbols formed by bits of said transmitted signal after remapping said order of bits of said received signal to said different order of bits for said transmitted signal.

15. A method comprising remapping an order of bits of a received signal from a source node to a different order of the bits for a transmitted signal to a destination node when said transmitted signal is constructed with a first modulation scheme different from said received signal constructed with a second different modulation scheme, where said first modulation scheme comprises a symbol having a first number of bits and said second modulation scheme comprises a symbol having a different second number of bits.

16. The method as recited in claim 15, further comprising:
- de-interleaving symbols formed by bits of said received signal prior to remapping said order of bits of said received signal; and
- interleaving symbols formed by bits of said transmitted signal after remapping said order of bits of said received signal to said different order of bits for said transmitted signal.

17. The method as recited in claim 15, further comprising:
- demodulating said received signal prior to remapping said order of bits of said received signal; and
- modulating said transmitted signal after remapping said order of bits of said received signal to said different order of bits for said transmitted signal.

18. The method as recited in claim 15 wherein said remapping maintains integrality of bits between said received and transmitted signals.

19. The method as recited in claim 15 wherein said remapping protects a most significant bit of and maintains an equilibrium of bits of said received signal.

20. The method as recited in claim 15 wherein said received signal is constructed with a 16 quadrature amplitude modulation scheme and said transmitted signal is constructed with a 256 quadrature amplitude modulation scheme, said order of bits of said received signal is (1 2 3) (4 5 6) (7 8 9) (10 11 12) and said different order of bits for said transmitted signal is one of (10 1 2 3) (11 4 5 6) (7 8 9 12) and (10 1 2 3) (4 5 6 11) (7 8 9 12).

* * * * *